United States Patent
Tanabe

(10) Patent No.: US 8,609,748 B2
(45) Date of Patent: Dec. 17, 2013

(54) MODIFIED PEROVSKITE TYPE COMPOSITE OXIDE, METHOD FOR PREPARING THE SAME, AND COMPOSITE DIELECTRIC MATERIAL

(75) Inventor: Shinji Tanabe, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 232 days.

(21) Appl. No.: 12/737,473

(22) PCT Filed: Jul. 16, 2009

(86) PCT No.: PCT/JP2009/062860
§ 371 (c)(1),
(2), (4) Date: Apr. 19, 2011

(87) PCT Pub. No.: WO2010/008040
PCT Pub. Date: Jan. 21, 2010

(65) Prior Publication Data
US 2011/0190432 A1    Aug. 4, 2011

(30) Foreign Application Priority Data

Jul. 18, 2008  (JP) .................................. 2008-187270
Jul. 18, 2008  (JP) .................................. 2008-187646

(51) Int. Cl.
*C08K 9/02*     (2006.01)
*C09C 3/06*     (2006.01)

(52) U.S. Cl.
USPC ........................... 523/200; 428/403; 428/404

(58) Field of Classification Search
USPC ................... 523/200; 428/403, 404
See application file for complete search history.

(56) References Cited

U.S. PATENT DOCUMENTS

2007/0049485 A1 *  3/2007  Tanabe et al. ................. 501/136

FOREIGN PATENT DOCUMENTS

| JP | 2003-049092 A | 2/2003 |
| JP | 2004-253219 A | 9/2004 |
| JP | 2005-002281 A | 1/2005 |
| JP | 2005-008665 A | 1/2005 |
| JP | 2005-015652 A | 1/2005 |
| WO | WO-2005/093763 A1 | 10/2005 |

OTHER PUBLICATIONS

Machine translation of JP 2003-137649, May 13, 2003.*

* cited by examiner

*Primary Examiner* — Vickey Nerangis
(74) *Attorney, Agent, or Firm* — Edwards Wildman Palmer LLP; James E. Armstrong, IV; Nicholas J. DiCeglie, Jr.

(57) ABSTRACT

Provided is a modified perovskite type composite oxide in which the dielectric characteristics are equal to or better than those prior to modification, there is no substantial elution of coating components from the modifying coating components, and change in the specific surface areas over time and elution of the A-site metals are suppressed effectively, while the cracking traits are good. A modified perovskite type composite oxide in which the particle surface of a perovskite type composite oxide is coated with a first component of at least one selected from $TiO_2$ and $SiO_2$ and a second component of at least one selected from a group consisting of Al, Zr, Nd, La, Ce, Pr, and Sm, wherein the coating is formed by hydrolyzing at least one selected from a hydrolyzable $TiO_2$ precursor and a hydrolyzable $SiO_2$ precursor as a source of the first component and a salt of at least one selected from a group consisting of Al, Zr, Nd, La, Ce, Pr, and Sm as a source of the second component, and then calcining them.

5 Claims, No Drawings

MODIFIED PEROVSKITE TYPE COMPOSITE OXIDE, METHOD FOR PREPARING THE SAME, AND COMPOSITE DIELECTRIC MATERIAL

CROSS REFERENCE TO RELATED APPLICATIONS

This application is related to co-pending application: "MODIFIED PEROVSKITE TYPE COMPOSITE OXIDE, METHOD FOR PREPARING THE SAME, AND COMPOSITE DIELECTRIC MATERIAL" filed even date herewith in the name of Shinji TANABE as a national phase entry of PCT/JP2009/062861, which application is assigned to the assignee of the present application and is incorporated by reference herein.

TECHNICAL FIELD

The present invention relates to a modified perovskite type composite oxide, a method for preparing the same, and a composite dielectric material using the modified perovskite type composite oxide.

BACKGROUND ART

In order to produce small-sized, thin, and high-density electronic instruments, a multilayer printed wiring board has been frequently used. By providing a layer including high-dielectric constant materials on the inner layer or surface layer of such a multilayer printed wiring board to improve the package density, it becomes possible to cope with demand for production of smaller-sized, thinner, and higher-density electronic instruments.

Conventionally, a ceramic sintered body obtained by molding ceramic powders and then sintering the resultant has been used as a high-dielectric constant material. Thus, the size and shape of the material has been restricted by a molding method. In addition, since a sintered body is very hard and fragile, it has been difficult to process the sintered body freely, and thus it has been extremely difficult to obtain any given shape or a complicated shape.

In this regard, a composite dielectric material formed by dispersing an inorganic filler with a high dielectric constant in a resin has drawn attention due to its high processability. For example, a perovskite type composite oxide is known as such an inorganic filler with a high dielectric constant used herein (see, for example, Patent Citation 1). However, the perovskite type composite oxide has a problem in that the specific surface area changes over time and the dielectric characteristics are deteriorated. In addition, it has another problem in that when it is brought into contact with water, A-site metals such as Ba, Ca, Sr, and Mg in the structure are eluted, and thus, peeling of the interface between the resin and the inorganic filler or deterioration in insulation due to ion migration occurs.

Meanwhile, as described in Patent Citations 2 to 6, it is known that an inorganic filler with a high dielectric constant, such as barium titanate, is surface-treated with a coupling agent for the purpose of improving dispersibility in a resin.
Patent Citation 1: Pamphlet of International Publication WO 2005/093763
Patent Citation 2: Japanese Patent Laid-Open No. 2003-49092
Patent Citation 3: Japanese Patent Laid-Open No. 2004-253219
Patent Citation 4: Japanese Patent Laid-Open No. 2005-2281
Patent Citation 5: Japanese Patent Laid-Open No. 2005-8665
Patent Citation 6: Japanese Patent Laid-Open No. 2005-15652

DISCLOSURE OF INVENTION

Technical Problem

However, the present inventors have investigated with regard to this, and as a result, they have found that even though the particle surface of a perovskite type composite oxide is simply treated with a coupling agent, the change in the specific surface areas over time or the elution of A-site metals such as Ba cannot be reduced sufficiently, and moreover, even when the perovskite type composite oxide particle after treatment is subjected to a general cracking treatment, a significant deviation from the particle size distribution prior to treatment is caused. If the particle size distribution changes significantly, a problem occurs in that a property of being evenly filled with resin and/or an affinity with resin is lowered. Also, another problem occurs in that even when it is attempted to keep the particle size distribution of the treated particle close to the particle size distribution prior to treatment, a noticeably long time is taken for cracking or an untreated surface is exposed through the destruction of the particles. In addition, yet another problem occurs in that coated components are eluted from the coated components modifying the perovskite type composite oxide.

Accordingly, the present invention has been made to solve the above-described problems, and thus it has the objectives to provide a modified perovskite type composite oxide in which the dielectric characteristics are equal to or better than those prior to modification, there is no substantial elution of coating components from the coating components modifying the perovskite type composite oxide, and change in the specific surface areas over time and elution of the A-site metals of the perovskite type composite oxide are suppressed effectively, while the cracking traits are good, a method for preparing the same, and a composite dielectric material using the modified perovskite type composite oxide.

Technical Solution

Therefore, the present inventors have made extensive investigations in order to solve the above-described problems, and as a result, they have found that a modified perovskite type composite oxide in which the particle surface of a perovskite type composite oxide is coated with a coating layer that is produced by hydrolyzing a hydrolyzable $TiO_2$ precursor and/or a hydrolyzable $SiO_2$ precursor, and a salt of a specific metal element, and then calcining them, solves the above-described problems, thereby completing the present invention.

That is, the present invention is directed to a modified perovskite type composite oxide in which the particle surface of a perovskite type composite oxide is coated with a first component of at least one selected from $TiO_2$ and $SiO_2$ and a second component of at least one selected from a group consisting of Al, Zr, Nd, La, Ce, Pr, and Sm, wherein the coating is formed by hydrolyzing at least one selected from a hydrolyzable $TiO_2$ precursor and a hydrolyzable $SiO_2$ precursor as a source of the first component and a salt of at least one selected from a group consisting of Al, Zr, Nd, La, Ce, Pr, and Sm as a source of the second component, and then calcining them.

It is preferable that the first component be $TiO_2$ and the second component be at least one selected from a group consisting of Nd, La, Ce, Pr, and Sm.

It is preferable that the first component be $SiO_2$ and the second component be at least one selected from a group consisting of Al, Zr, Nd, La, Ce, Pr, and Sm.

It is preferable that the coating be in a ratio from 0.05% by mass to 20% by mass in terms of oxides with respect to the perovskite type composite oxide.

It is preferable that the perovskite type composite oxide to be coated be of an $ABO_3$ type and the A-site element is at least one selected from a group consisting of Ba, Ca, Sr and Mg and the B-site element be at least one selected from a group consisting of Ti and Zr.

It is preferable that the BET specific surface area of the perovskite type composite oxide to be coated be $0.5\ m^2/g$ to $12\ m^2/g$.

Furthermore, the present invention is directed to a method for preparing the modified perovskite type composite oxide, including (A1) a step of dispersing perovskite type composite oxide particles in a solvent to prepare a slurry, (A2) a step of adding a source of a first component of at least one selected from a hydrolyzable $TiO_2$ precursor and a hydrolyzable $SiO_2$ precursor and a salt of a source of a second component of at least one selected from a group consisting of Al, Zr, Nd, La, Ce, Pr, and Sm to the slurry obtained in (A1), carrying out a hydrolysis reaction of the precursor(s) and the salt in the presence of a catalyst, and then drying the slurry, and (A3) a step of calcining the dried product obtained in (A2).

It is preferable that the solvent be a hydrophilic organic solvent and the catalyst be an organic alkali.

Moreover, the present invention is directed to a composite dielectric material, which includes the above-described modified perovskite type composite oxide and a polymer material.

BEST MODE FOR CARRYING OUT THE INVENTION

Hereinbelow, the present invention will be described in detail with reference to its preferred embodiments.
(Modified Perovskite Type Composite Oxide)

The modified perovskite type composite oxide of the present invention is a modified perovskite type composite oxide in which the particle surface is coated with a first component of at least one selected from $TiO_2$ and $SiO_2$ and a second component of at least one selected from a group consisting of Al, Zr, Nd, La, Ce, Pr, and Sm, wherein the coating is formed by hydrolyzing at least one selected from a hydrolyzable $TiO_2$ precursor and a hydrolyzable $SiO_2$ precursor as a source of the first component and a salt of at least one selected from a group consisting of Al, Zr, Nd, La, Ce, Pr, and Sm as a source of the second component, and then calcining them.

In the modified perovskite type composite oxide of the present invention, a modified perovskite type composite oxide in which the first component is $TiO_2$ and the second component is at least one selected from a group consisting of Nd, La, Ce, Pr, and Sm, or a modified perovskite type composite oxide in which the first component is $SiO_2$ and the second component is at least one selected from a group consisting of Al, Zr, Nd, La, Ce, Pr, and Sm is preferred, from the viewpoint that there is no substantial elution of coating components from the modifying coating components, the effects of suppressing change in specific surface areas over time and the elution of the A-site metals of the perovskite type composite oxide effectively are particularly high, and the cracking traits are good.

The perovskite type composite oxide to be modified is not particularly limited, but it is preferably a perovskite type composite oxide in which at least one metal element selected from the group consisting of Ca, Ba, Sr, and Mg is disposed in an A-site and at least one metal element selected from the group consisting of Ti and Zr is disposed in a B-site in an $ABO_3$-type perovskite. Specific examples of the preferable compound include $BaTiO_3$, $CaTiO_3$, $SrTiO_3$, $MgTiO_3$, $Ba_xCa_{1-x}TiO_3$ (wherein x satisfies $0<x<1$), $Ba_xSr_{1-x}ZrO_3$ (wherein x satisfies $0<x<1$), $BaTi_xZr_{1-x}O_3$ (wherein x satisfies $0<x<1$), and $Ba_xCa_{1-x}Ti_yZr_{1-y}O_3$ (wherein x satisfies $0<x<1$ and y satisfies $0<y<1$). These perovskite type composite oxides may be used singly or in combination of two or more kinds thereof.

The preparation history of such a perovskite type composite oxide is not particularly limited, and for example, the perovskite type composite oxides obtained by ordinary methods such as a co-precipitation method, a hydrolysis method, a wet method such as a hydrothermal synthesis method, a sol-gel method, and a solid-phase method are used. The physical properties of such perovskite type composite oxides are not particularly limited, but the perovskite type composite oxides preferably have a BET specific surface area of $0.5\ m^2/g$ to $12\ m^2/g$, and more preferably $1.5\ m^2/g$ to $6\ m^2/g$ in terms of handling ability, dispersibility, and adhesion with a resin. Further, the perovskite type composite oxides having an average particle diameter of $0.1\ \mu m$ to $2\ \mu m$, and preferably $0.2\ \mu m$ to $1\ \mu m$ are preferable because they further improve handling ability and dispersibility. This average particle diameter is determined by a laser light scattering method. In addition, in order to obtain a product with a high purity, perovskite type composite oxides with a low content of impurities content are particularly preferable.

Furthermore, the perovskite type composite oxide to be modified may contain accessory component elements. Examples of the accessory component elements include metal elements, metalloid elements, transition metal elements, and rare earth elements, having an atomic number of 3 or more, other than elements in the A-site and the B-site that constitute a perovskite type composite oxide. Among these, at least one selected from Sc, Y, La, Ce, Pr, Nd, Pm, Sm, Eu, Gd, Tb, Dy, Ho, Er, Tm, Yb, Lu, V, Bi, Al, W, Mo, Nb, and Si is preferable. Further, the content of such accessory component elements is 0.05% by mole to 20% by mole, and more preferably 0.5% by mole to 5% by mole, with respect to the perovskite type composite oxide.

Moreover, the particle shape of the perovskite type composite oxide is not particularly limited, but it may be any one of a spherical shape, a granular shape, a planar shape, a scale shape, a whisker shape, a rod shape, a filamentous shape, and the like.

In the modified perovskite type composite oxide of the present invention, the coating including a first component of at least one selected from $TiO_2$ and $SiO_2$ and a second component of at least one selected from a group consisting of Al, Zr, Nd, La, Ce, Pr, and Sm is characterized in that it is formed by hydrolyzing at least one selected from a hydrolyzable $TiO_2$ precursor and a hydrolyzable $SiO_2$ precursor as a source of the first component and a salt of at least one selected from a group consisting of Al, Zr, Nd, La, Ce, Pr, and Sm as a source of the second component, and then calcining the hydrolyzed product. Usually, the untreated perovskite type composite oxide has a basic pH of the particle surface, but a surface potential that cannot be obtained originally from barium titanate-based oxides can be formed since the above-described coating can adjust the pH of the particles surface to a neutral or around basic pH (pH 7 to 9, and preferably 7 to 8). Accordingly, its application availability becomes wide to other applications such as an application exclusively for ceramic capacitors, as well as inorganic fillers, external additives for toners, or the like. Further, the pH value of the particle surface is determined by adding 100 g of pure water to 4 g of the modified perovskite type composite oxide, stirring the mixture at 25° C. for 60 hours, and then measuring the pH of the supernatant by a pH meter.

Examples of the hydrolyzable $TiO_2$ precursor include titanium alkoxides such as tetramethoxytitanium, tetraethoxytitanium, tetrapropoxytitanium, tetraisopropoxytitanium, and tetra-n-butoxytitanium, and titanate-based coupling agents such as isopropyltriisostearoyl titanate, isopropyltridodecylbenzenesulfonyl titanate, isopropyltris(dioctylpyrophosphate)titanate, tetraoctylbis(ditridecylphosphite)titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, isopropyltri(N-aminoethyl-aminoethyl)titanate, dicumylphenyloxyacetate titanate, diisostearoylethylene titanate, polydiisopropyl titanate, tetranormalbutyl titanate, and polydinormalbutyl titanate. These hydrolyzable $TiO_2$ precursors may be used singly or in combination of two or more kinds thereof.

Examples of the hydrolyzable $SiO_2$ precursor include silane alkoxides such as tetramethoxysilane, tetraethoxysilane, tetra-n-propoxysilane, tetraisopropoxysilane, and tetra-n-butoxysilane, for example, silane coupling agents such as γ-(2-aminoethyl)aminopropyltrimethoxysilane, γ-(2-aminoethyl)aminopropylmethyldimethoxysilane, aminosilane, γ-aminopropyltriethoxysilane, N-(2-aminoethyl)-3-aminopropyltrimethoxysilane, N-β-(N-vinylbenzylaminoethyl)-γ-aminopropyltrimethoxysilane, hexamethyldisilazane, trimethylsilane, trimethylchlorsilane, dimethyldichlorsilane, methyltrichlorsilane, aryldimethylchlorsilane, benzyldimethylchlorsilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, vinyltriacetoxysilane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, N-β-(aminoethyl)-γ-aminopropyltrimethoxysilane, γ-ureidopropyltriethoxysilane, and aminofluorinesilane. These hydrolyzable $SiO_2$ precursors may be used singly or in combination of two or more kinds thereof.

Examples of the salt of Al include aluminum alkoxides such as trimethoxyaluminum, triethoxyaluminum, tripropoxyaluminum, triisopropoxyaluminum, tri-n-butox yaluminum, tri-sec-butoxyaluminum, tri-tert-butoxyaluminum, aluminate-based coupling agents such as ethyl acetoacetate aluminum diisopropylate, methyl acetoacetate aluminum diisopropylate, ethyl acetate aluminum dibutylate, alkyl acetoacetate aluminum diisopropylate, and aluminum monoacetyl acetate bis(ethylacetoacetate), aluminum acetate, and aluminum nitrate nonahydrate. These salts of Al may be used singly or in combination of two or more kinds thereof.

Examples of the salt of Zr include zirconium alkoxides such as tetraethoxyzirconium, tetramethoxyzirconium, tetraisopropoxyzirconium, tetra-n-butoxyzirconium, and tetra-tert-butoxyzirconium, zirconium alkoxides such as ethoxyzirconium steareate, zirconium chelate compounds such as zirconiumtetraacetyl acetonate, and zirconium α-hydroxycarboxylate, and zirconate-based coupling agents such as zirconium soaps and zirconium acetate. These salts of Zr may be used singly or in combination of two or more kinds thereof.

Examples of the salt of Nd, La, Ce, Pr, and Sm include acetates, nitrates, chlorides, and alkoxides, and more specifically, neodymium acetate monohydrate, neodymium nitrate hexahydrate, neodymium chloride hexahydrate, triisopropoxyneodymium, lanthanum acetate 1.5-hydrate, lanthanum nitrate hexahydrate, triisopropoxylantane, lanthanum chloride heptahydrate, cerium acetate monohydrate, cerium nitrate hexahydrate, cerium chloride heptahydrate, praseodymium acetate dihydrate, praseodymium nitrate hexahydrate, praseodymium chloride heptahydrate, triisopropoxypraseodymium, samarium acetate tetrahydrate, samarium nitrate hexahydrate, samarium chloride hexahydrate, and triisopropoxysamarium. These salts may be used singly or in combination of two or more kinds thereof.

The calcining temperature during formation of the coating layer is preferably 400° C. or higher, and more preferably 600° C. to 1200° C. If the calcining temperature is too low, organic matter remains in the coating component, and further, the coating is not sufficiently densified. Thus, the effect of reduction in elution of the A-site metals is low, and there may be cases where the A-site metal-eluted amount becomes larger than that prior to coating, or the relative dielectric constant is reduced. On the other hand, if the calcining temperature is too high, fusion between the particles or particle growth becomes significant, and even though the cracking treatment is carried out, the shape or the particle size distribution tends to deviate considerably from that prior to modification, and therefore, the calcining temperature is preferably 1200° C. or lower. Further, the calcining time is preferably 2 hours or longer, and more preferably 3 hours to 10 hours.

The ratio of the coating is preferably 0.05% by mass to 20% by mass, and more preferably 0.1% by mass to 5% by mass, in terms of oxides with respect to the perovskite type composite oxide. If the ratio of the coating is less than 0.05% by mass, there may be cases where the effects of suppressing change in the specific surface areas over time and reducing the elution cannot be obtained sufficiently, whereas if the ratio of the coating is more than 20% by mass, there may be cases where the dielectric characteristics of the modified perovskite type composite oxide are reduced. Further, from the viewpoint that stoichiometric homogeneity is kept with respect to the first component, the amount of the second component element contained in the coating is preferably 0.04% by mass to 95% by mass, and more preferably 0.03% by mass to 80% by mass, in terms of oxides. Particularly, when the first component is $TiO_2$, the amount of the second component is preferably 0.04% by mass to 15% by mass, and more preferably 0.08% by mass to 3% by mass, in terms of oxides, in the coating, and when the first component is $SiO_2$, the second component is preferably 5% by mass to 95% by mass, and more preferably 20% by mass to 80% by mass, in terms of oxides, in the coating, which is particularly desirable from the viewpoint that elution of the A-site metals can be suppressed more efficiently.

<Method for Preparing Modified Perovskite Type Composite Oxide>

The modified perovskite type composite oxide of the present invention can be prepared by a method including the following steps:

(A1) a step of dispersing the perovskite type composite oxide particles in a solvent to prepare a slurry, (A2) a step of adding a source of a first component of at least one selected from a hydrolyzable $TiO_2$ precursor and a hydrolyzable $SiO_2$ precursor and a salt of a source of a second component of at least one selected from a group consisting of Al, Zr, Nd, La, Ce, Pr, and Sm to the slurry obtained in (A1), carrying out a hydrolysis reaction of the precursor(s) and the salt in the presence of a catalyst, and then drying the slurry, and (A3) a step of calcining the dried product obtained in the (A2).

In step (A1), preferably 100 parts by mass to 900 parts by mass, and more preferably 150 parts by mass to 400 parts by mass of the solvent is added to 100 parts by mass of the perovskite type composite oxide to be modified, followed by stirring, thereby preparing a slurry in which each of the particles of the perovskite type composite oxide are uniformly dispersed.

As the solvent, water, a hydrophilic organic solvent, or a mixture thereof can be used, but it is preferable to use a hydrophilic organic solvent from the viewpoint that an A-site metal such as Ba, Ca, Sr, and Mg may be eluted from the perovskite type composite oxide by contact with water, or that the cracking traits of the obtained modified perovskite type composite oxide is further improved.

Examples of the hydrophilic organic solvent include glycols and alcohols. Specific examples of the glycol include propylene glycol monoethyl ether, propylene glycol monomethyl ether, dipropylene glycol monomethyl ether, diethylene glycolmonobutylether, ethylene glycol, propylene glycol, and diethylene glycol. Further, specific examples of the alcohol include methanol, ethanol, isopropyl alcohol, n-butanol, and pentanol. These solvents may be used singly or in combination of two or more kinds thereof. Among these solvents, propylene glycol monoethyl ether, dipropylene glycol monomethyl ether, diethylene glycolmonobutylether, methanol, ethanol, isopropyl alcohol, and n-butanol are particularly preferable, from the viewpoint that the dispersibility of the perovskite type composite oxide is good.

Moreover, in step (A1), in order to disperse the perovskite type composite oxide uniformly in the solvent, a dispersing device such as a high-speed agitator, a colloid mill and a homogenizer may be used as necessary, and in addition, a commonly used dispersant may be added as necessary to the slurry.

In step (A2), the first component source, the second component source, and a catalyst are added to the slurry prepared in step (A1), followed by performing a hydrolysis reaction, so that a hydrolyzed product is precipitated uniformly on the particle surface of the perovskite type composite oxide.

Further, the second component source may be used singly or in combination of two or more kinds thereof.

The total of the addition amounts of the first component source and the second component source may be determined appropriately, taking into consideration the solubility in a solvent or a dilution medium, a reaction yield, or the like, such that the above-described preferable coating ratio is given.

As the catalyst, inorganic alkali such as ammonia, sodium hydroxide, and potassium hydroxide, inorganic alkaline salts such as ammonium carbonate, ammonium bicarbonate, sodium carbonate, and sodium hydrogen carbonate, organic alkalis such as monomethylamine, dimethylamine, trimethylamine, monoethylamine, diethylamine, triethylamine, ethylenediamine, pyridine, aniline, choline, guanidine, tetramethylammonium hydroxide, and tetrapropylammonium hydroxide, or organic alkaline salts such as ammonium formate, ammonium acetate, monomethylamine formate, dimethylamine acetate, pyridine lactate, guanidinoacetic acid, and aniline acetate may be used. Among these, when a hydrophilic organic solvent is used as the solvent, organic alkalis such as tetramethylammonium hydroxide, and tetrapropylammonium hydroxide are preferable.

The addition amount of the catalyst is preferably 0.2 to 10, and more preferably 0.5 to 5 as a molar ratio with respect to a total of the first component source and the second component source. Further, the catalyst is preferably added to the slurry in the form of a solution obtained by dissolving it in water.

As conditions for the hydrolysis reaction, the reaction temperature is preferably 40° C. to 120° C., and preferably 50° C. to 90° C., and the reaction time is preferably 1 hour or more, and more preferably 3 hours to 10 hours. In addition, the hydrolysis reaction is preferably carried out under stirring.

After completion of the hydrolysis reaction, solid-liquid separation is carried out according to an ordinary method, and the resultant is washed as necessary to recover a perovskite type composite oxide coated with the hydrolyzed product, which is then dried, and subjected to a slight cracking, as necessary. The recovering method is not particularly limited, and means such as spray drying may be applied.

Further, as for the conditions for the drying treatment, the drying temperature is preferably 40° C. or higher, more preferably 60° C. to 120° C., and the drying time is preferably 1 hour or more, and more preferably 3 hours to 10 hours. In addition, a vacuum pump or the like may be used in combination and drying can be performed even under reduced pressure.

Step (A3) is a step of calcining the dried product (the perovskite type composite oxide coated with the hydrolyzed product) obtained in step (A2), preferably at 400° C. or higher, and more preferably at 600° C. to 1200° C., so as to form a coating.

In the method for preparing the modified perovskite type composite oxide of the present invention, the perovskite type composite oxide coated with the hydrolyzed product is calcined, so that elution of A-site metal elements can be noticeably reduced further. If the calcining temperature is too low, organic matter remains in the coating components and densification of the coating is insufficient. Thus, the effect of reduction in the elution of the A-site metals is low, and sometimes, elution of a coating component from the coating components modifying the perovskite type composite oxide increases, the A-site metal-eluted amount becomes larger than that prior to coating, or the relative dielectric constant is reduced. On the other hand, if the calcining temperature is too high, fusion between the particles or particle growth becomes significant, and even though the cracking treatment is carried out, the shape or the particle size distribution tends to deviate considerably from that prior to modification, and therefore, the calcining temperature is preferably 1200° C. or lower. Further, the calcining time is preferably 2 hours or longer, and more preferably 3 hours to 10 hours.

After calcining, by performing cooling properly and carrying out a cracking treatment, a modified perovskite type composite oxide having a particle surface coated with a coating layer including a first component of at least one selected from $TiO_2$ and $SiO_2$ and a second component of at least one selected from a group consisting of Al, Zr, Nd, La, Ce, Pr, and Sm can be obtained. The modified perovskite type composite oxide of the present invention has good cracking traits, and thus any cracking treatment is sufficient as long as it is usually carried out in an ordinarily used mixer such as a food mixer and a coffee mill as a small-scale device, and a Henschel mixer or the like as an industrial device.

As for the modified perovskite type composite oxide of the present invention thus obtained, the dielectric characteristics are equal to or better than those prior to modification, there is no substantial elution of coating components from the coating components modifying the perovskite type composite oxide, the change in the specific surface areas over time is suppressed, and also, the elution of the A-site metals such as Ba, Ca, Sr, and Mg that are eluted by the contact with a water content or the like is noticeably reduced. In addition, it is possible to obtain a particle size distribution that is close to the particle size distribution prior to treatment only by performing a slight cracking treatment, which corresponds to good cracking traits. Further, when the particle surface of the modified perovskite type composite oxide of the present invention is further surface-modified with a silane coupling agent or the like, the cracking traits are good, and accordingly, it becomes possible to carry out the modification uniformly while keeping the particle size distribution close to the particle size distribution of the perovskite type composite oxide, and the affinity with the polymer material as described later is improved.

For this reason, the modified perovskite type composite oxide of the present invention can be particularly preferably used as an inorganic filler which is used for a composite dielectric material including a polymeric material such as a thermosetting resin, a thermoplastic resin, and a photosensitive resin, and an inorganic filler. Moreover, the modified perovskite type composite oxide can also be applied to other applications such as an external additive agent for a toner.

Next, the composite dielectric material of the present invention will be described.

The composite dielectric material of the present invention includes a polymeric material and the modified perovskite type composite oxide as an inorganic filler.

The composite dielectric material of the present invention is preferably a material having a relative dielectric constant of 15 or more, and more preferably 20 or more, which can be produced by incorporating preferably 60% by mass or more, and more preferably 70% by mass to 90% by mass of the modified perovskite type composite oxide to the polymeric material as described later.

Examples of the polymeric material that can be used in the present invention include a thermosetting resin, a thermoplastic resin, and a photosensitive resin.

Examples of the thermosetting resin include known thermosetting resins such as an epoxy resin, a phenol resin, a polyimide resin, a melamine resin, cyanate resins, bismaleimides, addition polymers of bismaleimides and diamine, a multifunctional cyanic ester resin, a double-bond-added polyphenylene oxide resin, an unsaturated polyester resin, a polyvinyl benzyl ether resin, a polybutadiene resin, and a fumarate resin. These thermosetting resins may be used singly or in combination of two or more kinds thereof. Among these thermosetting resins, an epoxy resin or a polyvinyl benzyl ether resin is preferred, in terms of the balance of heat resistance, workability, and price.

Examples of the epoxy resin used in the present invention include monomers, oligomers, and polymers as a whole, which have at least two epoxy groups in a single molecule. Examples of the epoxy resin include: those obtained by epoxidation of novolac resins, including, as typical examples, a phenol novolac epoxy resin and an orthocresol novolac epoxy resin, which are obtained by condensing or co-condensing, in the presence of an acidic catalyst, phenols such as phenol, cresol, xylenol, resorcin, catechol, bisphenol A, and bisphenol F and/or naphthols such as α-naphthol, β-naphthol, and dihydroxynaphthalene, and aldehydes such as formaldehyde, acetaldehyde, propionealdehyde, benzaldehyde, and salicylaldehyde, those obtained by epoxidation of additions or polyadditions of diglycidyl ethers or phenols such as bisphenol A, bisphenol B, bisphenol F, bisphenol S, and alkyl-substituted or alkyl-unsubstituted bisphenol, and dicyclopentadienes or terpenes, glycidyl ester epoxy resins obtained by the reaction of a polybasic acid such as phthalic acid, and a dimer acid with epichlorohydrin, glycidyl amine epoxy resins obtained by the reaction of polyamine such as diaminodiphenylmethane, and isocyanuric acid with epichlorohydrin, linear aliphatic epoxy resins obtained by oxidizing an olefin bond with a peracid such as peracetic acid, and alicyclic epoxy resins. These may be used singly or in combination of two or more kinds thereof.

All epoxy resin curing agents that are known to persons skilled in the art can be used herein, but particular examples thereof include $C_2$-$C_{20}$ linear aliphatic diamines such as ethylenediamine, trimethylenediamine, tetramethylenediamine, and hexamethylenediamine, amines such as metaphenylenediamine, paraphenylenediamine, paraxylenediamine, 4,4'-diaminodiphenylmethane, 4,4'-diaminodiphenylpropane, 4,4'-diaminodiphenylether, 4,4'-diaminodiphenylsulfone, 4,4'-diaminodicyclohexane, bis(4-aminophenyl)phenylmethane, 1,5-diaminonaphthalene, metaxylylenediamine, paraxylylenediamine, 1,1-bis(4-aminophenyl)cyclohexane, and dicyanodiamide, novolac-type phenol resins such as a phenol novolac resin, a cresol novolac resin, a tert-butylphenol novolac resin, and a nonylphenol novolac resin, resol-type phenol resins, polyoxystyrenes such as polyparaoxystyrene, phenol aralkyl resins, phenol resins obtained by co-condensation of a phenol compound in which a hydrogen atom binding to an aromatic ring other than a benzene ring or a naphthalene ring is substituted with a hydroxyl group, with a carbonyl compound, such as a naphthol aralkyl resin, and an acid anhydride. These may be used singly or in combination of two or more kinds thereof.

The blending amount of the epoxy resin curing agent is an equivalent ratio in the range from preferably 0.1 to 10, and more preferably 0.7 to 1.3, with respect the epoxy resin.

In addition, for the purpose of promoting the curing reaction of the epoxy resin in the present invention, a known curing promoter may be used. Examples of the curing promoter include tertiary amine compounds such as 1,8-diazabicyclo(5,4,0)undecene-7, triethylenediamine, and benzyldimethylamine, imidazole compounds such as 2-methylimidazole, 2-ethyl-4-methylimidazole, 2-phenylimidazole, and 2-phenyl-4-methylimidazole, organic phosphine compounds such as triphenylphosphine and tributylphosphine, phosphonium salts, and ammonium salts. These may be used singly or in combination of two or more kinds thereof.

The polyvinyl benzyl ether resin used in the present invention is obtained from a polyvinyl benzyl ether compound. The polyvinyl benzyl ether compound is preferably a compound represented by the following general formula (1):

[Chem. 1]

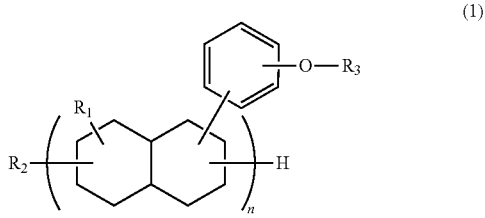

(1)

In the general formula (1), $R_1$ represents a methyl group or an ethyl group, and $R_2$ represents a hydrogen atom or a hydrocarbon group having 1 to 10 carbon atoms. The hydrocarbon group represented by $R_2$ is an alkyl group, an aralkyl group, an aryl group, or the like, which may have a substituent. Examples of the alkyl group include a methyl group, an ethyl group, a propyl group, and a butyl group. Examples of the aralkyl group include a benzyl group. Examples of the aryl group include a phenyl group. $R_3$ represents a hydrogen atom or a vinylbenzyl group. Further, the hydrogen atom of $R_3$ is derived from a starting compound used in the synthesis of the compound represented by the general formula (1). When the molar ratio of the hydrogen atom to the vinylbenzyl group is 60:40 to 0:100, the curing reaction can be promoted sufficiently, and further, in the composite dielectric material of the present invention, sufficient dielectric characteristics are obtained, which is thus preferable. n represents an integer of 2 to 4.

The polyvinyl benzyl ether compound may be singly polymerized as a resin material and then used, or it may be copolymerized with other monomers and then used. Examples of the copolymerizable monomers include styrene, vinyltoluene, divinylbenzene, divinyl benzyl ether, allylphenol, allyloxybenzene, diallyl phthalate, acrylic acid ester, methacrylic acid ester, vinylpyrrolidone, and a denaturated product thereof. The blending ratio of these monomers is 2% by mass to 50% by mass with respect to the polyvinyl benzyl ether compound.

Polymerization and curing of the polyvinyl benzyl ether compound can be carried out by known methods. The curing can be carried out either in the presence or absence of a curing agent. As the curing agent, known radical polymerization initiators such as benzoyl peroxide, methyl ethyl ketone peroxide, dicumyl peroxide, and t-butyl perbenzoate can be used. The amount of curing agent to be used is 0 part by mass to 10 parts by mass of the curing agent with respect to 100 parts by mass of the polyvinyl benzyl ether compound. ***The curing temperature varies depending on the presence or absence of a curing agent and the type of curing agent, but in order to sufficiently cure the polyvinyl benzyl ether compound, the curing temperature is preferably 20° C. to 250° C., and more preferably at 50° C. to 250° C.

In order to adjust the miring, hydroquinone, benzoquinone, copper salts, or the like may be blended.

Examples of the thermoplastic resin include known thermoplastic resins such as a (meth)acryl resin, a hydroxystyrene resin, a novolac resin, a polyester resin, a polyimide resin, a nylon resin, and a polyetherimide resin.

Examples of the photosensitive resin include known photosensitive resins such as a photopolymerizable resin and a photocrosslinking resin.

Examples of the photopolymerizable resin which is used in the present invention include those containing an acrylic copolymer having an ethylene unsaturated group (a photosensitive oligomer), a photopolymerized compound (a photosensitive monomer), and a photopolymerization initiator, and those containing an epoxy resin and a photo-cation polymerization initiator. Examples of the photosensitive oligomer include a product obtained by adding acrylic acid to an epoxy resin, a product obtained by further reacting the product with an acid anhydride, a product obtained by reacting a copolymer containing a (meth)acryl monomer having a glycidyl group with (meth)acrylic acid, a product obtained by further reacting the product with an acid anhydride, a product obtained by reacting a copolymer containing a (meth)acryl monomer having a hydroxyl group with glycidyl(meth)acrylate, a product obtained by further reacting the product with an acid anhydride, and a product obtained by reacting a copolymer containing a maleic anhydride with a (meth)acryl monomer having a hydroxyl group or a (meth)acryl monomer having a glycidyl group. These may be used singly or in combination of two or more kinds thereof.

Examples of the photopolymerizable compound (a photosensitive monomer) include 2-hydroxyethyl (meth)acrylate, 2-hydroxypropyl(meth)acrylate, N-vinylpyrrolidone, acryloylmorpholine, methoxy polyethylene glycol (meth)acrylate, polyethylene glycol di(meth)acrylate, polypropylene glycol di(meth)acrylate, N,N-dimethyl acrylamide, phenoxyethyl(meth)acrylate, cyclohexyl(meth)acrylate, trimethylolpropane (meth)acrylate, pentaerythritol tri(meth)acrylate, dipentaerythritol hexa(meth)acrylate, tris(hydroxyethyl)isocyanurate di(meth)acrylate, and tris(hydroxyethyl)isocyanurate tri(meth)acrylate. These may be used singly or in combination of two or more kinds thereof.

Examples of the photopolymerization initiator include benzoin and alkyl ethers thereof, benzophenones, acetophenones, anthraquinones, xanthones, and thioxanthones. These may be used singly or in combination of two or more kinds thereof. In addition, commonly used known photopolymerization promoters such as benzoic acid-type promoters, and tertiary amine-type promoters may be used in combination with such photopolymerization initiators. Examples of a photo-cationic polymerization initiator include triphenylsulfonium hexafluoroantimonate, diphenylsulfonium hexafluoroantimonate, triphenylsulfonium hexafluorophosphate, benzyl-4-hydroxyphenylmethylsulfonium hexafluorophosphate, and ferrous aromatic compound salts of Bronsted acid (Nihon Ciba-Geigy K. K., CG24-061). These may be used singly or in combination of two or more kinds thereof.

With the use of a photo-cationic polymerization initiator, an epoxy resin is subjected to ring-opening polymerization. The reaction rate of photo polymerization is higher when using an alicyclic epoxy resin than when using a common glycidyl ester epoxy resin. Thus, the use of such an alicyclic epoxy resin is preferable. It may also be possible to use an alicyclic epoxy resin in combination with a glycidyl ester epoxy resin. Examples of the alicyclic epoxy resin include vinylcyclohexene diepoxide, alicyclic diepoxyacetal, alicyclic diepoxyadipate, alicyclic diepoxycarboxylate, and EHPE-3150 manufactured by Daicel Chemical Industries, Ltd. These may be used singly or in combination of two or more kinds thereof.

Examples of the photocrosslinking resin include a water-soluble polymer dichromate, a vinyl polycinnamate (Kodak KPR), and a cyclized rubber azide (Kodak KTFR). These may be used singly or in combination of two or more kinds thereof.

The dielectric constant of the photosensitive resin is generally as low as 2.5 to 4.0. Accordingly, in order to increase the dielectric constant of a binder, a higher-dielectric polymer (for example, SDP-E of Sumitomo Chemical Co., Ltd. (∈: 15<), a cyano resin of Shin-Etsu Chemical Co., Ltd. (∈:

18<)), and a higher-dielectric liquid (for example, SDP-S of Sumitomo Chemical Co., Ltd. (∈: 40<)) may be added within a range which does not impair the photosensitive characteristics of the photosensitive resin.

In the present invention, the polymeric materials may be used singly or in combination of two or more kinds thereof.

In the composite dielectric material of the present invention, the blending amount of the modified perovskite type composite oxide is preferably 60% by mass or more, and more preferably 70% by mass to 90% by mass as a blending ratio during composition with the resin. This is because, if the blending amount of the modified perovskite type composite oxide is less than 60% by mass, there is a tendency that a sufficient relative dielectric constant may not be obtained, whereas if it is more than 90% by mass, there is a tendency that the viscosity increases and the dispersibility deteriorates, and also there is concern, for example, that sufficient strength cannot be obtained or the like during consolidation of a composite. The composite dielectric material is preferably a material having a relative dielectric constant of preferably 15 or more, and more preferably 20 or more through blending.

In addition, the composite dielectric material of the present invention may include other fillers in an addition amount within the range that does not impair the effect of the present invention. Examples of other filler include fine carbon powders such as acetylene black and ketchen black, fine graphite powders, and silicon carbide.

Moreover, to the composite dielectric material of the present invention may be added a curing agent, glass powders, a coupling agent, a polymer additive, a reaction diluent, a polymerization inhibitor, a leveling agent, a wetting improver, a surfactant, a plasticizer, an ultraviolet absorber, an antioxidant, an antistatic agent, an inorganic filler, a fungicide, a humidity controller, a dye-dissolving agent, a buffer, a chelating agent, a fire retardant, and a silane coupling agent (an integral blending method) within the range that does not impair the effect of the present invention. These additives may be used singly or in combination of two or more kinds thereof.

The composite dielectric material of the present invention can be prepared by preparing a composite dielectric paste, and then eliminating an organic solvent or performing a curing reaction or a polymerization reaction.

The composite dielectric paste contains resin components, the modified perovskite type composite oxide, and an additive and an organic solvent, which may be added as necessary.

The resin components contained in the composite dielectric paste are a polymerizable compound of a thermosetting resin, a polymer of a thermoplastic resin, or a polymerizable compound of a photosensitive resin. These resin components may be used singly or in combination of two or more kinds thereof.

The polymerizable compound as used herein means a compound having a polymerizable group, and examples thereof include a precursor polymer prior to complete curing, a polymerizable oligomer, and a monomer. In addition, the polymer as used herein means a compound obtained after a polymerization reaction has been substantially completed.

The organic solvent added as necessary varies depending on the resin components used. The organic solvent is not particularly limited as long as it is able to dissolve the resin components, but examples thereof include N-methylpyrrolidone, dimethylformamide, ether, diethyl ether, tetrahydrofuran, dioxane, ethyl glycol ether of monoalcohol containing 1 to 6 carbon atoms having a linear or branched alkyl group, propylene glycol ether, butyl glycol ether, ketone, acetone, methyl ethyl ketone, methyl isopropyl ketone, methyl isobutyl ketone, cyclohexanone, ester, ethyl acetate, butyl acetate, ethylene glycol acetate, methoxy propyl acetate, methoxy propanol, other halogen hydrocarbons, alicyclic hydrocarbons, and aromatic hydrocarbons. These organic solvent may be used singly or in combination of two or more kinds thereof. Among these, hexane, heptane, cyclohexane, toluene, and dixylene are preferred.

In the present invention, the composite dielectric paste is prepared to have a desired viscosity, and then used. The viscosity of the composite dielectric paste is usually 1,000 mPa·s to 1,000,000 mPa·s (25° C.), and in consideration of the coating property of the composite dielectric paste, it is preferably 10,000 mPa·s to 600,000 mPa·s (25° C.).

The composite dielectric material of the present invention can be processed into a molded body having a film shape, a bulk shape, or a predetermined shape, and then used. It can be particularly used as a high-dielectric film having a thin film shape.

In order to prepare a composite dielectric film using the composite dielectric material of the present invention, it may be prepared according to a conventional known method of using a composite dielectric paste. An example will be given below.

The composite dielectric paste can be applied to a substrate, and then dried to mold it into one having a film shape. As such a substrate, a plastic film on the surface of which a delamination treatment has been performed can be used, for example. When the composite dielectric paste is applied onto the plastic film on the surface of which a delamination treatment has been performed when molding into a film form, it is preferable that it be generally molded into a film state and then the substrate be peeled from the film before use. Examples of the plastic film used as a substrate include films such as a polyethylene terephthalate (PET) film, a polyethylene film, a polypropylene film, a polyester film, a polyimide film, and films made of aramid, kapton, and polymethylpentene. Further, the plastic film used as a substrate has a thickness of preferably 1 μm to 100 μm, and more preferably 1 μm to 40 μm. In addition, as a mold-releasing treatment performed on the surface of the substrate, a mold-releasing treatment in which silicon, wax, a fluorine resin, or the like is applied onto the surface is preferably used.

Moreover, a metallic foil may be used as a substrate, and a dielectric film may be formed on the metallic foil. In such a case, the metallic foil used as a substrate can be used as an electrode of a condenser.

The method of applying the composite dielectric paste onto the substrate is not particularly limited, and a common application method can be used. For example, the application can be carried out using a roller method, a spray method, a silk-screen method, or the like.

After the dielectric film has been incorporated into a board such as a printed board, it can be thermally cured by heating. Further, when a photosensitive resin is used, it can be subjected to patterning by selective exposure.

Moreover, the composite dielectric material of the present invention may be subjected to extrusion molding according to a calendar method or the like, so that it may be molded into one having a film shape.

The extrusion-molded dielectric film may be molded such that it may be extruded onto the substrate. Further, when a metallic foil is used as a substrate, as the metallic foil, a foil made from copper, aluminum, brass, nickel, iron, or the like as the material, a foil including the alloy thereof, a composite foil, or the like can be used. Treatments such as a surface roughening treatment and application of an adhesive may be carried out on the metallic foil, as necessary.

In addition, a dielectric film may be formed between the metallic foils. In this case, the composite dielectric paste may be applied to a metallic foil, and another metallic foil may be placed thereon. Thereafter, the composite dielectric paste may be dried in a state in which it is sandwiched between the metallic foils, so as to form a dielectric film that is in a state in which it is sandwiched between the metallic foils. Moreover, the dielectric film may also be formed between such metallic foils by subjecting the film to extrusion molding so that the dielectric film may be sandwiched between the metallic foils.

In addition, the composite dielectric material of the present invention may be processed into a varnish using the organic solvent as described above, and a cloth or non-woven fabric may be impregnated with this varnish. It may be then dried to prepare a prepreg. The type of the cloth or non-woven fabric that can be used herein is not particularly limited, and known ones may be used. Examples of the cloth include a glass cloth, an aramid cloth, a carbon cloth, and stretched porous polytetrafluoroethylene. Examples of the non-woven fabric include an aramid non-woven fabric and a glass paper. The prepreg is laminated on an electronic part such as a circuit board, followed by curing, so that an insulation layer can be introduced into the electronic parts.

The composite dielectric material of the present invention has a high relative dielectric constant. Thus, it can be preferably used as a dielectric layer for electronic parts, particularly electronic parts such as a print circuit board, a semiconductor package, a condenser, a high-frequency antenna, and an inorganic EL.

In order to prepare a multilayer print wiring board using the composite dielectric material of the present invention, it can be prepared by a method known in the present technical field (see, for example, Japanese Patent Laid-Open Nos. 2003-192768, 2005-29700, 2002-226816, 2003-327827, and the like). Further, the following example shows a case in which a thermosetting resin is used as a polymeric material of the composite dielectric material.

The composite dielectric material of the present invention is processed into the dielectric film. The resin surface of the dielectric film is laminated on a circuit board by pressurization, heating, or using vacuum laminator. After lamination, the substrate is peeled from the film, a metallic foil is further laminated on the exposed resin layer, and the resin is then cured by heating.

Further, the composite dielectric material of the present invention is processed into a prepreg, but the lamination onto a circuit board can be carried out by vacuum pressing. Specifically, it is preferable that one surface of the prepreg be allowed to come into contact with a circuit board, and that a metallic foil be placed on the other surface, followed by pressing.

In addition, the composite dielectric material of the present invention can be used as varnish, and the varnish can be applied onto a circuit board by screen printing, curtain coating, roll coating, spray coating, or the like, and then dried to form an intermediate insulation layer of a multilayer printed wiring board.

In the present invention, when a printed wiring board including an insulation layer at the outermost layer is prepared, a through hole part or a via hole part is made using a drill or a laser, and the surface of an insulation layer is treated with a roughening agent to form fine bumps and dips. As a method of roughening an insulation layer, a method of immersing a board, on which an insulation resin layer has been formed, in a solution of an oxidizer and the like, a method of spraying a solution of an oxidizer and the like, etc. can be applied depending on the technical specification. Specific examples of the roughening agent include oxidizers such as dichromate, permanganate, ozone, hydrogen peroxide/sulfuric acid; and nitric acid, organic solvents such as N-methyl-2-pyrrolidone, N,N-dimethylformamide, and methoxypropanol, alkaline aqueous solutions such as caustic soda and caustic potash, acidic aqueous solutions such as sulfuric acid and hydrochloric acid, and various types of plasma treatments. These treatments may be used in combination. As described above, a printed wiring board, on which an insulation layer has been roughened, is then subjected to dry plating such as evaporation, sputtering, and ion plating, and wet plating such as non-electrolytic and electrolytic plating, so as to form a conductor layer thereon. At this time, it may also be possible to form a plating resist in a pattern opposite to the conductor layer, and to form a conductor layer only by non-electrolytic plating. After a conductor layer has been formed as described above, it may be subjected to an annealing treatment to promote the curing of a thermosetting resin, to further improve the peeling strength of the conductor layer. Thus, a conductor layer can be formed as an outermost layer.

Moreover, a metallic foil that forms the intermediate insulation layer may be multilayered by laminating it by a vacuum press. Such metallic foil that forms an intermediate insulation layer is laminated on a printed wiring board, in which an inner layer circuit has been formed, by a vacuum press, to produce a printed wiring board including a conductor layer as an outermost layer thereof. Furthermore, a prepreg using the composite dielectric material of the present invention, together with a metallic foil, is laminated on the printed wiring board, in which an inner layer circuit has been formed, by a vacuum press, to produce a printed wiring board including a conductor layer as an outermost layer thereof. A certain through hole or a via hole is made by a conformal method using a drill or a laser, and desmearing is then performed on the insides of such through hole and via hole, to form fine bumps and dips. Thereafter, wetting plating such as non-electrolytic and electrolytic plating is performed to enable conduction between layers.

Further, these steps are repeated several times, as necessary, and after completion of the circuit formation of the outermost layer, a solder resist is subjected to pattern printing and thermosetting according to a screen printing method, or to whole surface printing/thermosetting according to curtain coating, roll coating, or spray coating. Thereafter, a pattern is formed with a laser to obtain a desired multilayer printed wiring board.

EXAMPLES

Hereinbelow, the present invention will be described with reference to Examples. However, the present invention is not intended to be limited thereto.

<Perovskite Type Composite Oxide Sample>

As a perovskite type composite oxide sample to be modified, commercially available one $(Ba_{0.92}Ca_{0.08})(Ti_{0.71}Zr_{0.29})O_3$ (average particle diameter 0.76 μm, and BET specific surface area 2.17 m$^2$/g) which had been obtained by a solid-phase method was used. Further, the average particle diameter was determined by a laser light scattering method. In addition, 4 g of the perovskite type composite oxide was dispersed in 100 ml of pure water to prepare a 4%-by-mass slurry. The slurry was stirred at 25° C. at 100 rpm for 1 hour, and the pH of the supernatant was then measured with a pH meter. As a result, the pH was 9.22.

Example 1

Perovskite Type Composite Oxide Coated with TiO$_2$/Nd (Step A1)

100 parts by mass of a perovskite type composite oxide sample was added to 150 parts by mass of n-butanol, and the mixture was sufficiently dispersed to prepare a slurry.

(Step A2)

1.7 parts by mass of tetra-n-butoxytitanium (hydrolyzable TiO$_2$ precursor) and 0.9 parts by mass of neodymium acetate monohydrate (salt of Nd) were added to the slurry obtained in step A1 under stirring, and subsequently, 3 parts by mass of a 20%-by-mass aqueous tetramethylammonium hydroxide solution was added thereto. Then, a hydrolysis reaction was carried out at 90° C. for 3 hours. After completion of the hydrolysis reaction, solid-liquid separation was carried out according to an ordinary method, and the separated cake thus obtained was dispersed in 300 parts by mass of ethanol, and the dispersion was then stirred for 1 hour. Thereafter, solid-liquid separation was carried out again, and the resultant was dried at 80° C. for 20 hours, followed by cracking, to obtain a perovskite type composite oxide having a hydrolyzed product precipitated on the particle surface.

(Step A3)

The perovskite type composite oxide obtained in step A2 was calcined at 1000° C. for 4 hours in air to obtain a modified perovskite type composite oxide, in which the particle surface was coated with a coating layer including TiO$_2$ and Nd. Various physical properties of the modified perovskite type composite oxide sample thus obtained are shown in Table 1. Further, 4 g of the modified perovskite type composite oxide sample was dispersed in 100 ml of pure water to prepare a 4%-by-mass slurry. The slurry was stirred at 25° C. at 100 rpm for 1 hour, and the pH of the supernatant was then measured with a pH meter. As a result, the pH was 7.40.

Example 2

Perovskite Type Composite Oxide Coated with TiO$_2$/La

In the same manner as in Example 1 except that lanthanum acetate 1.5-hydrate (salt of La) was used instead of neodymium acetate monohydrate (salt of Nd), a modified perovskite type composite oxide sample coated with a coating layer including TiO$_2$ and La was obtained. Various physical properties of the modified perovskite type composite oxide sample thus obtained are shown in Table 1. Further, the pH of the modified perovskite type composite oxide sample was measured in the same manner as in Example 1, and as a result, the pH was 7.46.

Example 3

Perovskite Type Composite Oxide Coated with TiO$_2$/Ce

In the same manner as in Example 1 except that cerium acetate monohydrate (salt of Ce) was used instead of neodymium acetate monohydrate (salt of Nd), a modified perovskite type composite oxide sample coated with a coating layer including TiO$_2$ and Ce was obtained. Various physical properties of the modified perovskite type composite oxide sample thus obtained are shown in Table 1. Further, the pH of the modified perovskite type composite oxide sample was measured in the same manner as in Example 1, and as a result, the pH was 7.23.

Example 4

Perovskite Type Composite Oxide Coated with TiO$_2$/Pr

In the same manner as in Example 1 except that praseodymium acetate dihydrate (salt of Pr) was used instead of neodymium acetate monohydrate (salt of Nd), a modified perovskite type composite oxide sample coated with a coating layer including TiO$_2$ and Pr was obtained. Various physical properties of the modified perovskite type composite oxide sample thus obtained are shown in Table 1. Further, the pH of the modified perovskite type composite oxide sample was measured in the same manner as in Example 1, and as a result, the pH was 7.51.

Example 5

Perovskite Type Composite Oxide Coated with TiO$_2$/Sm

In the same manner as in Example 1 except that samarium acetate tetrahydrate (salt of Sm) was used instead of neodymium acetate monohydrate (salt of Nd), a modified perovskite type composite oxide sample coated with a coating layer including TiO$_2$ and Sm was obtained. Various physical properties of the modified perovskite type composite oxide sample thus obtained are shown in Table 1. Further, the pH of the modified perovskite type composite oxide sample was measured in the same manner as in Example 1, and as a result, the pH was 7.34.

Example 6

Perovskite Type Composite Oxide Coated with TiO$_2$/Nd

In the same manner as in Example 1 except that the calcining temperature was changed to 650° C., a modified perovskite type composite oxide sample coated with a coating layer including TiO$_2$ and Nd was obtained. Various physical properties of the modified perovskite type composite oxide sample thus obtained are shown in Table 1. Further, the pH of the modified perovskite type composite oxide sample was measured in the same manner as in Example 1, and as a result, the pH was 7.43.

Example 7

Perovskite Type Composite Oxide Coated with SiO$_2$/Al (Step A1)

100 parts by mass of a perovskite type composite oxide sample was added to 150 parts by mass of ethanol, followed by sufficiently carrying out dispersion, to prepare a slurry.

(Step A2)

1 part by mass of tetraethoxysilane (hydrolyzable SiO$_2$ precursor) and 2 parts by mass (diluted 3-fold with water) of aluminum acetate (salt of Al) were added to the slurry obtained in step A1 under stirring, and subsequently, 2 parts by mass of a 20%-by-mass aqueous tetramethylammonium hydroxide solution was added thereto. Then, a hydrolysis reaction was carried out at 60° C. for 3 hours. After completion of the hydrolysis reaction, solid-liquid separation was carried out according to an ordinary method, and the separated cake thus obtained was dispersed in 300 parts by mass of ethanol, and the dispersion was then stirred for 1 hour. Thereafter, solid-liquid separation was carried out again, and the resultant was dried at 80° C. for 20 hours, followed by cracking, to obtain a perovskite type composite oxide having a hydrolyzed product precipitated on the particle surface.
(Step A3)

The perovskite type composite oxide obtained in step A2 was calcined at 1050° C. for 4 hours in air to obtain a modified perovskite type composite oxide, in which the particle surface was coated with a material including $SiO_2$ and Nd. Various physical properties of the modified perovskite type composite oxide sample thus obtained are shown in Table 1. Further, 4 g of the modified perovskite type composite oxide sample was dispersed in 100 ml of pure water to prepare a 4%-by-mass slurry. The slurry was stirred at 25° C. at 100 rpm for 1 hour, and the pH of the supernatant was then measured with a pH meter. As a result, the pH was 8.18. The coating amounts of $SiO_2$ and $Al_2O_3$ were 0.09% by mass and 0.15% by mass, respectively.

Example 8

Perovskite Type Composite Oxide Coated with $SiO_2$/Nd (Step A1)
100 parts by mass of a perovskite type composite oxide sample was added to 150 parts by mass of n-butanol, and the mixture was sufficiently dispersed to prepare a slurry.
(Step A2)
1.46 parts by mass of tetraethoxysilane (hydrolyzable $SiO_2$ precursor) and 2.38 parts by mass (diluted 6-fold with water) of neodymium acetate monohydrate (salt of Nd) were added to the slurry obtained in step A1 under stirring, and subsequently, 10 parts by mass of a 20%-by-mass aqueous tetramethylammonium hydroxide solution was added thereto. Then, a hydrolysis reaction was carried out at 90° C. for 3 hours. After completion of the hydrolysis reaction, solid-liquid separation was carried out according to an ordinary method, and the separated cake thus obtained was dispersed in 300 parts by mass of ethanol, and the dispersion was then stirred for 1 hour. Thereafter, solid-liquid separation was carried out again, and the resultant was dried at 80° C. for 20 hours, followed by cracking, to obtain a perovskite type composite oxide having a hydrolyzed product precipitated on the particle surface.
(Step A3)
The perovskite type composite oxide obtained in step A2 was calcined at 900° C. for 4 hours in air to obtain a modified perovskite type composite oxide, in which the particle surface was coated with a material including $SiO_2$ and Nd. Various physical properties of the modified perovskite type composite oxide sample thus obtained are shown in Table 1. Further, 4 g of the modified perovskite type composite oxide sample was dispersed in 100 ml of pure water to prepare a 4%-by-mass slurry. The slurry was stirred at 25° C. at 100 rpm for 1 hour, and the pH of the supernatant was then measured with a pH meter. As a result, the pH was 7.73. The coating amounts of $SiO_2$ and $Nd_2O_3$ were 0.31% by mass and 1.09% by mass, respectively.

Comparative Example 1

Perovskite Type Composite Oxide Treated with Silane Coupling Agent 100 parts by mass of the perovskite type composite oxide sample was put into a coffee mill. Under stirring, 1.2 parts by mass of a silane coupling agent (manufactured by Shin-Etsu Chemical Co., Ltd.; product name KBM-403) was added thereto over 1 minute, followed by further stirring for 2 minutes. Thereafter, the treated powders were taken out and then put into the coffee mill again, followed by stirring for 2 minutes. Thereafter, the treated powders were taken out. As a result of such operations, the concentration of the silane coupling agent immobilized after a drying step was calculated to be 0.73% by mass. The treated powders were left to stand still and dried at 80° C. for 20 hours. During the drying, the silane coupling agent was subjected to a hydrolysis step and a dehydration condensation process, to obtain a perovskite type composite oxide sample treated with the silane coupling agent. Various physical properties of the perovskite type composite oxide sample treated with the silane coupling agent thus obtained are shown in Table 1. Further, the pH of the perovskite type composite oxide sample treated with the silane coupling agent was measured in the same manner as in Example 1, and as a result, the pH of the supernatant was 5.73.

Comparative Example 2

Perovskite Type Composite Oxide Coated with $Al_2O_3$

In the same manner as in Example 7 except that in step A2, tetraethoxysilane was not used, 150 parts by mass of ethanol, 4.00 parts by mass (diluted 4-fold with water) of aluminum acetate (salt of Al), and 4.00 parts by mass of a 20%-by-mass aqueous tetramethylammonium solution were used, the condition for a hydrolysis reaction was set at 60° C. for 3 hours, and the condition for calcining was set at 650° C., perovskite type composite oxide sample coated with $Al_2O_3$ was obtained. Various physical properties of the perovskite type composite oxide sample coated with $Al_2O_3$ thus obtained are shown in Table 1. Further, the pH of the perovskite type composite oxide sample coated with $Al_2O_3$ was measured in the same manner as in Example 1, and as a result, the pH was 10.40.

TABLE 1

| | Calcining temperature (° C.) | Type of coating | Coating amount of each component | Total coating amount (% by mass) | pH |
|---|---|---|---|---|---|
| Example 1 | 1000 | $TiO_2$•$Nd_2O_3$ | $TiO_2$; 0.43% by mass $Nd_2O_3$; 0.45% by mass | 0.88 | 7.40 |
| Example 2 | 1000 | $TiO_2$•$La_2O_3$ | $TiO_2$; 0.42% by mass $La_2O_3$; 0.42% by mass | 0.84 | 7.46 |

TABLE 1-continued

| | Calcining temperature (° C.) | Type of coating | Coating amount of each component | Total coating amount (% by mass) | pH |
|---|---|---|---|---|---|
| Example 3 | 1000 | $TiO_2 \cdot Ce_2O_3$ | $TiO_2$; 0.43% by mass $Ce_2O_3$; 0.44% by mass | 0.87 | 7.23 |
| Example 4 | 1000 | $TiO_2 \cdot Pr_2O_3$ | $TiO_2$; 0.40% by mass $Pr_2O_3$; 0.42% by mass | 0.82 | 7.51 |
| Example 5 | 1000 | $TiO_2 \cdot Sm_2O_3$ | $TiO_2$; 0.36% by mass $Sm_2O_3$; 0.39% by mass | 0.75 | 7.34 |
| Example 6 | 650 | $TiO_2 \cdot Nd_2O_3$ | $TiO_2$; 0.43% by mass $Nd_2O_3$; 0.45% by mass | 0.88 | 7.43 |
| Example 7 | 1050 | $SiO_2 \cdot Al_2O_3$ | $SiO_2$; 0.09% by mass $Al_2O_3$; 0.15% by mass | 0.24 | 8.18 |
| Example 8 | 900 | $SiO_2 \cdot Nd_2O_3$ | $SiO_2$; 0.31% by mass $Nd_2O_3$; 1.09% by mass | 1.40 | 7.73 |
| Comparative Example 1 | — | Silane coupling agent | $SiO_2$; 0.73% by mass | 0.73 | 5.73 |
| Comparative Example 2 | 650 | $Al_2O_3$ | $Al_2O_3$; 0.28% by mass | 0.28 | 10.4 |

Further, for various lanthanide components, Al, and Si in Examples 1 to 8 and Comparative Example 2, the "total coating amounts" in Table 1 were determined by dissolving the powders that have been subjected to a coating treatment in an aqueous hydrochloric acid solution, then directly performing a measurement by means of ICP-AES, and converting the resultants in terms of to oxides. Further, for $TiO_2$, the total coating amounts were determined by measuring Ti that had not been precipitated from the solvent after the hydrolysis reaction by means of ICP-AES, subtracting them from the addition amount to be charged, and then converting the resultants in terms of oxides. These determined values were added up for calculation. In Comparative Example 1, the total coating amount was determined by measuring the carbon amount in the sample thermally decomposed from the total solid carbon analysis measurement.

<Dielectric Characteristics>

9 g each of the modified perovskite type composite oxide samples of Examples 1 to 8, and untreated perovskite type composite oxide samples, 3 g of a thermosetting epoxy resin (manufactured by Japan Epoxy Resins Co., Ltd., product name: EPICOAT 815, molecular weight of about 330, specific gravity of 1.1, and nominal viscosity at 25° C. of 9 to 12 P), and 0.24 g of a curing promoter (1-isobutyl-2-methylimidazole, nominal viscosity at 25° C. being 4 to 12 P) were kneaded using an agitator with a defoaming function (manufactured by THINKY, product name: AWATORI RENTARO) was used to prepare an epoxy resin composition. Further, the kneading condition was as follows: the stirring operation was carried out for 5 minutes and the defoaming operation was carried out for 5 minutes.

Each of the obtained epoxy resin compositions was cured at 120° C. for 30 minutes to prepare a composite dielectric sample, and the dielectric characteristics were evaluated by an ordinary method.

The dielectric characteristics of the composite dielectric samples using the modified perovskite type composite oxide samples of Examples 1 to 8 were compared with those obtained when using the untreated perovskite type composite oxide samples, and thus, it was found that they were equal to or better than those obtained when using the untreated perovskite type composite oxide samples.

<Elution Test>

4 g each of the modified perovskite type composite oxide samples of Examples 1 to 8 and Comparative Examples 1 and 2 was dispersed in 100 ml of pure water to prepare a 4%-by-mass slurry. The slurry was stirred at 25° C. at 100 rpm for 1 hour, and was then separated by filtration. The concentrations of Ba and Ca in the filtrate and the concentrations of Ti, Al, Nd, La, Ce, Pr, Sm, and Si derived from the coating components were measured by means of ICP-AES, and quantified as an eluted portion from the samples. The results are shown in Table 2. Moreover, the untreated perovskite type composite oxide samples were also presented as Comparative Example 3 in Table 2.

<Evaluation of Cracking Traits>

250 g each of the modified perovskite type composite oxide samples of Examples 1 to 8 and Comparative Example's 1 and 2 was put into a food mixer and subjected to a cracking treatment for 10 minutes. The average particle diameter of the sample after the cracking treatment was determined by a laser light scattering method. Taking the average particle diameter of the untreated perovskite type composite oxide sample as a standard, an increase rate in the average particle diameter of 50% or less was evaluated as Cracking Traits ⊚, an increase rate of more than 50% and 100% or less was evaluated as Cracking Traits ○, an increase rate of more than 100% and 200% or less was evaluated as Cracking Traits Δ, and an increase rate of more than 200% was evaluated as Cracking Traits x. The results are shown in Table 2.

<Change in Specific Surface Area over Time>

Each of the modified perovskite type composite oxide samples of Examples 1 to 6 and Comparative Examples 1 to 3, and the untreated perovskite type composite oxide samples was exposed for 24 hours under an environment of a temperature 40° C. and a humidity of 90%, and the BET specific surface areas of the samples were then measured. Further, the untreated perovskite type composite oxide samples were taken as Comparative Example 3. The BET specific surface area before exposure was taken as S1 and the BET specific surface area after exposure was taken as S2, in which the change rate [%] in the specific surface areas was determined by the formula: $(S2-S1)/S1 \times 100$. A change rate in the specific surface area of 2% or less was evaluated as ⊚, a change rate of more than 2% and 5% or less was evaluated as ○, a change rate of more than 5% and 10% or less was evaluated as Δ, and a change rate of more than 10% was evaluated as x. The results are shown in Table 2. Further, the BET specific surface area was obtained by measuring the entire surface areas of the measurement samples using MACSORB HM-1201 manufactured by Mountech Co., Ltd., and normalized as measured values of the samples.

TABLE 2

| | | | Coating component | | | Cracking traits | Change in specific surface areas over time |
|---|---|---|---|---|---|---|---|
| | Ba-eluted amount (ppm) | Ca-eluted amount (ppm) | Ti-eluted amount (ppm) | Si-eluted amount (ppm) | Other element added-eluted amount (ppm) | | |
| Example 1 | 396 | 9 | 0 | — | 0 | ◎ | ◎ |
| Example 2 | 418 | 10 | 0 | — | 0 | ◎ | ◎ |
| Example 3 | 330 | 8 | 0 | — | 0 | ◎ | ◎ |
| Example 4 | 440 | 10 | 0 | — | 0 | ◎ | ◎ |
| Example 5 | 374 | 9 | 0 | — | 0 | ◎ | ◎ |
| Example 6 | 420 | 5 | 0 | — | 3 | ◎ | ◎ |
| Example 7 | 5 | 0 | — | 10 | 21 | ○ | ○ |
| Example 8 | 528 | 12 | — | 5 | 0 | ◎ | ◎ |
| Comparative Example 1 | 714 | 35 | — | 321 | — | X | Δ |
| Comparative Example 2 | 1 | 0 | — | — | 342 | ◎ | X |
| Comparative Example 3 | 788 | 52 | — | — | — | — | X |

The "other element added-eluted amount" in Table 2 is a value obtained by measurement of each of Nd (Example 1, Example 6, and Example 8), La (Example 2), Ce (Example 3), Pr (Example 4), Sm (Example 5), and Al (Example 7 and Comparative Example 2) in the filtrate.

As seen from the above-described results, in the modified perovskite type composite oxides of Examples 1 to the dielectric characteristics were equal to or better than those prior to modification, but elution of Ba and Ca was suppressed effectively and elution of a coating component from the coating components was also suppressed. Moreover, change in the specific surface areas over time was small and the cracking traits were good.

INDUSTRIAL APPLICABILITY

The present invention can have the objectives to provide a modified perovskite type composite oxide in which the dielectric characteristics are equal to or better than those prior to modification, there is no substantial elution of coating components from the coating components modifying the perovskite type composite oxide, change in the specific surface areas over time and elution of the A-site metals of the perovskite type composite oxide are suppressed effectively, while the cracking traits are good, a method for preparing the same, and a composite dielectric material using the modified perovskite type composite oxide.

The invention claimed is:

1. A modified perovskite type composite oxide in which a particle surface of a perovskite type composite oxide is coated with a first component of $TiO_2$ and a second component of at least one selected from the group consisting of Nd, La, Ce, Pr, and Sm, wherein the coating is formed by hydrolyzing a hydrolyzable $TiO_2$ precursor as a source of the first component and a salt of at least one selected from the group consisting of Nd, La, Ce, Pr, and Sm as a source of the second component, and then calcining them;
    and wherein the amount of the second component element contained in the coating is 0.04% by mass to 95% by mass, in terms of oxides.
2. The modified perovskite type composite oxide as set forth in claim 1, wherein the coating is at a ratio of 0.05% by mass to 20% by mass in terms of oxides with respect to the perovskite type composite oxide.
3. The modified perovskite type composite oxide as set forth in claim 1, wherein the perovskite type composite oxide is of an $ABO_3$ type, an A-site element is at least one selected from the group consisting of Ba, Ca, Sr, and Mg, and a B-site element is at least one selected from Ti and Zr.
4. The modified perovskite type composite oxide as set forth in claim 1, wherein the BET specific surface area of the perovskite type composite oxide is 0.5 $m^2/g$ to 12 $m^2/g$.
5. A composite dielectric material comprising the modified perovskite type composite oxide as set forth in claim 1 and a polymer material.

* * * * *